United States Patent [19]

Fowler et al.

[11] 4,059,515
[45] Nov. 22, 1977

[54] PROCESS FOR CLARIFICATION OF OIL-CONTAINING WASTE

[75] Inventors: William J. Fowler, Berlin, N.J.; Richard A. Heberle, Holland; Richard G. Tonkyn, Cornwells Heights; Norman Vorchheimer, Buckingham, all of Pa.

[73] Assignee: Betz Laboratories, Inc., Trevose, Pa.

[21] Appl. No.: 779,193

[22] Filed: Mar. 18, 1977

Related U.S. Application Data

[63] Continuation of Ser. No. 607,863, Aug. 26, 1975, abandoned.

[51] Int. Cl.² ............................................ B01D 17/02
[52] U.S. Cl. ..................................... 210/51; 210/43; 210/54; 252/344; 252/358
[58] Field of Search ................. 210/43, 52, 53, 54, 210/51, DIG. 27; 252/329, 344, 358; 260/583 DD, 583 P, 584 R, 584 B

[56] References Cited

U.S. PATENT DOCUMENTS 3,205,169 9/1965 Kirkpatrick et al. ............... 252/344
3,446,731 5/1969 Harsh ..................................... 210/43
3,756,959 9/1973 Vitalis et al. .......................... 210/43
3,855,299 12/1974 Witt ....................................... 210/54
3,900,423 8/1975 Markofsky ........................... 252/358

Primary Examiner—John Adee
Assistant Examiner—Ivars Cintins
Attorney, Agent, or Firm—Alexander D. Ricci; Steven H. Markowitz

[57] ABSTRACT

The present disclosure is directed to a process of separating oil from oil-containing wastewater which comprises treating the wastewater with a water-soluble cationic polymer obtained by the polymerization of an epihalohydrin with an alkylene polyamine having the formula

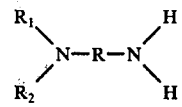

wherein R is a lower alkylene having from 2 to about 6 carbon atoms, and $R_1$ and $R_2$ are each a lower alkyl of from 1 to about 6 carbon atoms.

18 Claims, No Drawings

PROCESS FOR CLARIFICATION OF OIL-CONTAINING WASTE

This is a continuation division of application Ser. No. 607,863 filed Aug. 26, 1975, now abandoned.

BACKGROUND OF THE INVENTION

It is known that significant quantities of lubricants, cutting oils, and cutting fluids are used in industrial machining operations. In the automotive industry and related operations, these "oils", when spent, are sent to the plant's waste treatment facility where they are typically combined with other plant waste streams. In simple form, these "oils" are undiluted petroleum oils and an emulsifier. However, in practice, they typically contain fatty acids, surfactants, biocides, antioxidants and many other additives. Also, they may be contaminated with synthetic oils. These industrial wastes typically contain from 0.05% to 4% oil content by volume.

In view of recent rigid environmental standards, increases in oil prices and decreases in oil supply, it has become very important to recover these oils for reuse. Since the oily wastes are typically emulsions of oil in water, recovery can be accomplished using the well-known "demulsification - flocculation" separating process. For example, it has been known to incorporate a combination acid-alum treatment into an oil recovery process. At low pH (2 to 3), the aluminum complex exhibits a state of high positive valence. A nearly neutral-charged insoluble aluminum hydroxide is formed by hydrolyzation of alum at pH 6 to 7. Further pH increases produce the negatively-charged aluminate and solubility increases. The positively-charged alum at low pH neutralizes the negative stabilizing charge on the oil droplets of the emulsion to cause demulsification and coagulation. Upon hydrolysis the alum provides a surface for oil adsorption by van der Waals forces to cause flocculation. Accordingly, the pH of the oily waste is kept low to promote oil demulsification. In some applications, the oil is then floated and recovered by skimming. The pH is then elevated to cause aluminum hydroxide to precipitate, resulting in a floc which adsorbs the remaining oil. Alternatively, the flocculation recovery step could be used as a one-step method to recover the oil. However, these acid-alum treatment processes have inherent drawbacks. For example, large quantities of acid are necessary to lower the oily waste pH. Also, special equipment is necessary for handling such a low pH and special metallurgy is needed to prevent corrosion. In addition, neutralizing the low pH water increases operating costs. Also, high alum feedrates cause large sludge volumes, thus complicating oil recovery and creating a disposal problem. Finally, oil is extremely hard to extract from alum floc.

Accordingly, it is an object of the present invention to provide a novel water-soluble cationic polymeric material useable in separating oil from industrial oily wastes, which material would overcome the above-noted drawbacks of the acid-alum process. In this regard, the present inventors discovered that the separation of oil from oil-containing wastes could be effectively achieved by utilizing a water-soluble cationic polymer obtained by the polymerization of an epihalohydrin with a specific family of alkylene polyamine.

GENERAL DESCRIPTION OF THE INVENTION

In accordance with the present invention, the addition of alum can be drastically reduced or eliminated in separating oil from oil-containing wastewater by using the inventive water-soluble cationic polymeric materials in the recovery process. If a combined alum-polymer treatment is utilized, the pH of the wastewater should be properly adjusted to ensure that the alum will remain insoluble to act as a coagulant aid. A pH range of about 5.0 to about 8.0 is considered to be suitable, with 6.0 to 7.5 being the preferred range. If the polymer is used in the absence of alum, the activity of the polymer is separating the oil from the water has been found to be relatively independent of pH. If the pH of the wastewater is to be adjusted, sulfuric acid is considered to be suitable for the purpose. The basic process steps typically include the addition of acid (if needed), the addition of polymer and the addition of alum. However, the order of addition can be varied. Of course, simultaneous polymeralum feed is also possible. From studies it has been determined that polymer dosages ranging from about 0.5 to about 1000 ppm product are effective with 5 -750 representing the preferred range. When combined alum-polymer treatments are utilized, effective alum dosages were determined in the range of from about 10 - 1000 ppm with 50 - 500 ppm representing the preferred range.

Accordingly, by practicing the inventive oil separation process many advantages are realized. For example, smaller quantities of treatment chemicals are needed and the large volume of sludge typically generated by the alum is drastically reduced. Also, for example, large quantities of acid and caustic for drastic pH adjustments are no longer needed as is the case in the above-described alum-acid treatment process and the difficult-to-handle alum floc is avoided.

The water-soluble cationic polymeric materials which were developed in accordance with the present invention are those obtained by the polymerization of an epihalohydrin with an alkylene polyamine having the formula

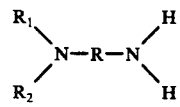

where R is a lower alkylene having from 2 to about 6 carbon atoms, e.g., ethylene, propylene, isopropylene, isopentyl, hexylene, etc.; $R_1 R_2$ each are a lower alkyl of from about 1 to about 6 carbon atoms, e.g., methyl, ethyl, propyl, isopropyl, pentyl, hexyl, isohexyl, etc.

The mole ratios of the epihalohydrin to the alkylene polyamine used in accordance herewith are from about 0.60 : 1 to about 2.7 : 1, and preferably from 0.75 : 1 to 1.3 : 1. The polymerization is carried out at a temperature of from about 60° to about 120° C and preferably 80° to 110° C by reacting with the alkylene polyamine from about 50 to about 90 percent of the mole(s) of epihalohydrin to be polymerized. The reaction is allowed to take place for a time sufficient for the reaction medium obtained to attain a relatively uniform viscosity, or more specifically, when substantially all of the reactive sites of the epihalohydrin have had the opportunity to react. The latter condition is essentially the reason for the reaction medium ultimately reaching a relatively uniform viscosity. After the reaction medium has obtained the relatively uniform viscosity, the remaining portion of the epihalohydrin is then added to the reaction medium either totally or incrementally and allowed to react to achieve the final product of the desired viscosity. When the final viscosity of the reaction medium is attained, i.e., all or substantially all of the reactive sites of the epihalohydrin have reacted, the reaction medium is preferably stabilized by acidification of the medium to a pH of from 1 to about 7 and preferably 2 to 5. A mineral acid such as hydrochloric, sulfuric, nitric or phosphoric is preferred but not the only possibilities for this purpose. Strong organic acids may also be used.

In the present description, viscosity is utilized as the criteria rather than molecular weight simply for convenience since the polymerization is preferably carried out in an aqueous medium of an alkaline pH, i.e., 7.5 to 12 and preferably 8 to 11. Accordingly, the reaction medium containing the water-soluble cationic polymer dissolved therein is more controllable utilizing the viscosity criteria.

Obviously, since the amount of water in the reaction medium will directly effect viscosity of the reaction medium and the final product, this factor must be taken into consideration in order to achieve the desired viscosity of the cationic polymer solutions if in fact an aqueous solution of the cationic polymer is desired. The viscosities obtainable can range quite considerably; however, for the purposes of the present invention and specifically with respect to the utility, viscosities equivalent of from about 10 to about 2000 centipoises at a 20% concentration are the most preferred. "Equivalent" in this regard means that a 35% concentration, for example having a viscosity of 300 cps, can be diluted to a 20% concentration and have a viscosity of 75 – 100 cps. Accordingly, the concentration and the viscosity set forth above for a 20% concentration is not to be construed as limitative of the viscosity but should be considered as a frame of reference. The concentrations, for example, may range from 15% to 60% with their own particular viscosities. Accordingly, a 50% solution having a viscosity of 1000 which can be diluted to a 20% solution having a viscosity of 30 is also considered transporting low active products (e.g., 20% polymer : 80% water). The pure polymer can later, for example, after arriving at its destination, be redissolved in water to a predetermined activity to produce the utilizable concentration.

In describing the preferred procedure for preparing the polymers of the invention, it was stated in essence that "the remaining portion of the epihalohydrin is then added either totally or incrementally and allowed to react." Although either method may be utilized, the preferred method is the incremental addition of the remaining porition with sufficient time before addition of the remaining portion(s) being provided to allow substantially complete reaction of the epihalohydrin reactive sites. The most preferable method utilizing the incremental addition concept is to add and react the remaining epihalohydrin in decreasingly smaller amounts allowing time for substantially complete reaction which is determined by the obtention of a relatively uniform viscosity. The incremental addition not only provides a better control over ultimate viscosity of the reaction medium and molecular weight of the resulting polymer, but also insures that the highest activity of the polymer as a flocculant or coagulant is achieved by avoiding polymeric gel formations which possess generally no flocculating activity.

The epihalohydrins which are preferred for use for the present purposes are epichlorohydrin and epibromohydrin, while epifluorohydrin may be used.

The alkylene polyamines preferred within the present invention are any which are encompassed by the generic formula set forth earlier and basically may be described as those which have at least one tertiary amino group and at least one primary amino group. Illustrative of the compounds which are operable for the purpose are dimethylaminopropylamine (N,N-dimethyl-1,3 propanediamine); diethylaminopropylamine (N,N-diethyl-1,3 propanediamine); N,N-dimethylaminoethylamine; and N,N-diethylaminoethylamine.

A cationic polymer prepared in accordance with the present invention using equimolar proportions of epichlorohydrin and N,N-dimethyl-1,3-propanediamine is believed to have the following structure

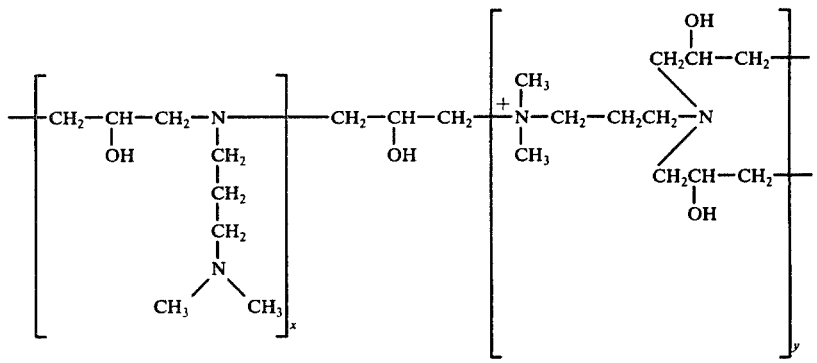

to be included in the scope of the invention.

As indicated earlier, the cationic polymer of the invention can also be obtained as a liquid composed solely of a reasonably pure polymer. In order to obtain polymer only, the aqueous solution can be vacuum distilled or evaporated by the film method to provide reasonably pure polymer. In some cases this may be desirable to avoid large expenditures or expenses in packaging and where $x$ is greater than $y$. However, as is well-known, it is difficult, if not impossible, to determine the exact chemical structure of an entire polymeric chain. Accordingly, in the present case, it is felt to be more accurate to describe the polymer by its method of preparation.

Having thus described the invention generally, specific embodiments are set forth below illustrating specific methods of preparation of the polymers and their respective activities.

SPECIFIC EMBODIMENTS

Example 1

To 471.0 g. of water in a 2 liter resin bottle equipped with thermometer, condenser and stirrer, was added 344.5 g. (3.38 mole) of N,N-dimethyl-1,3-propane diamine. To this was added dropwise over 1 hour 275.2 (2.97 mole) of epichlorohydrin. The solution was heated at 90° C for 1 hour. Epichlorohydrin (29.1 g., 0.31 mole) was then added at 90° C in nine decreasingly smaller portions, the last one being 0.1 g. until the desired viscosity was reached. The viscosity was determined 20 minutes after each addition of epichlorohydrin by timing the flow of a fixed amount of solution through a pipette. The reaction was then terminated by lowering the pH to 2.5 by the addition of 530 g. of an aqueous sulfuric acid solution (½ w/w). The resulting solution had a solids content of 50% and a Brookfield viscosity (spindle 2, 12 RPM) of 912 cps. Dilution to 35% solids resulted in a Brookfield viscosity (spindle 1, 12 RPM) of 94 cps (mole ratio of epi to amine = 0.97 :1).

Example 2

To 1089 g. of water in a 2 liter resin kettle equipped with stirrer, condenser and thermometer was added 229.5 g. (2.25 mole) of N,N-dimethyl-1,3-propane diamine. Then 183.5 g. (1.98 mole) of epichlorohydrin was added dropwise over one hour. The solution was heated at 90° C for 1 hour, and then epichlorohydrin was added in decreasingly smaller amounts. Twenty minutes after each addition, the viscosity change was determined by timing the flow of a fixed amount of solution through a pipette. After this epichlorohydrin was added, 200 g. of water was added to dilute the polymer. Then an additional 0.47 g. of epichlorohydrin was added to achieve the desired viscosity, followed by 320 g. of $H_2SO_4$ solution (½ w/w with $H_2O$), which lowered the pH to about 2.5 and terminated the reaction. Finally, the solution was poured into 742.5 g. of water giving a solids content of 29% and a Brookfield viscosity, spindle 1, 12 RPM of 175 cps (mole ratio of epi to amine = 1.08 : 1).

Example 3

To 1089 g. of $H_2O$ in a 2 liter 4 neck flask equipped with thermometer, condenser, and stirrer, was added 229.5 g. (2.25 mole) of N,N-dimethyl-1,3-propane diamine. Then 133.5 g. (1.44 mole) of epichlorohydrin was added dropwise over 1 hour. The solution was heated at 90° C for 1 hour, then epichlorohydrin was added in 8 gradually decreasing portions at 90° C. After each addition of epichlorohydrin, the solution was stirred 20 minutes, and the viscosity determined by timing the flow of a fixed amount of solution through a 10 ml. pipette. When the desired viscosity was reached, which required 100.3 g. (1.00 mole) of epichlorohydrin, 227 g. of sulfuric acid solution (1 : 2 w/w) and 917.5 g. of $H_2O$ were added, the solution filtered to remove some insoluble gel. The final solids were 20% with a Brookfield viscosity (spindle 2, 12 RPM) of 2100 cps (mole ratio epi to amine = 1.12 : 1).

Example 4

To 51.0 g. (0.50 mole) of N,N-dimethyl-1,3-propane diamine in 638 g. of water was added 40.3 g. (0.435 mole) of epichlorohydrin (EPI) at a rate such that the temperature did not exceed 90° C. The resulting solution was heated at 90° C for 1 hour. Then 35.4 g. (0.38 mole) of EPI was added in small portions to build viscosity, with the solution being heated for 20 minutes at 90° C after each addition. The viscous solution was then diluted with 445 g. of water, and 6.4 g. of concentrated sulfuric acid was added to reduce the pH to 6.5. Then 50.1 g. (0.54 mole) of EPI was added, again in small portions, with 20 minute reaction times at 90° C between portions, followed by 510 g. of water Additional amounts of EPI showed no signs of reaction or viscosity increase. The final solution had a pH of 6.0 and a viscosity (Brookfield spindle 2, 12 RPM) of 890 cps, and solids of 10.3%. Mole ratio of epi to amine = 2.7 : 1.

Example 5

To 4088 lbs of water in a 2000 gal. reactor were added 2158 lbs of dimethylaminopropylamine (DMAPA). To this were added 1778.4 lbs of epichlorohydrin at a rate of about 1.8 to 2.0 gals per minute. The resulting solution was heated at 194° F for 1 hour. Epichlorohydrin was then added at 194° F in decreasingly smaller portions, the last ones being 4 lbs until the desired viscosity was reached. The viscosity was determined 20 minutes after each addition of epichlorohydrin by taking a sample and running a Brookfield viscosity using a no. 2 spindle, at 20 RPM. The polymer was then diluted with 7592 lbs of water. The reaction was stopped by slowly adding about 965 lbs of 93.2% $H_2SO_4$ solution until the pH was lowered to 5.0 ± 1.0. The final solution had a viscosity of 1000 cps ± 200 at 86° F and at 50% solids.

Inventive products were tested extensively for demulsification and flocculation in various industrial plants representing various and sundry oil-containing wastewater systems. In accordance with test procedures, the effectiveness of treatment was determined by visual inspection of the wastewater. The test results, which follow, quite clearly demonstrate not only the efficacy of the inventive polymer in oil/water separation, but also the above-noted advantages over prior art processes. All reported inventive polymer dosages are product dosages.

Example 6

The oil-containing waste in this particular application resulted from the cutting and lubricating oils used in the production processes of an automotive plant. Initial pH before treatment was approximately 9.0.

A treatment program consisting solely of an inorganic coagulant (alum at optimum dosage of 600 ppm) resulted in fair oil/water separation. However, a large volume of sludge was generated.

When used in conjunction with 25 ppm (product) of an inventive polymer made according to Example 5, the optimum alum dosage was cut in half to 300 ppm and the sludge volume was reduced.

All treatment programs included initial pH adjustment of the oil-containing wastewater to approximately 7.0 with 10% $H_2SO_4$.

Some results of this treatment are reported in Table I below, with pure alum treatment being compared to alum-polymer treatment with respect to floc formation. The floc formation was given a number from 1 to 6 with a lower number indicating better floc formation.

TABLE I

| Alum (ppm) | Polymer (ppm) | Floc |
|---|---|---|
| 200 | — | 6 |
| 400 | — | 5 |
| 600 | — | 1 |
| 800 | — | 2 |
| 1000 | — | 3 |
| 1200 | — | 4 |
| — | 500 | 5 |
| — | 1000 | 5 |
| 300 | 25 | 2 |
| 300 | 50 | 2 |
| 400 | 80 | 2 |
| 100 | 250 | 2 |
| 100 | 500 | 1 |

Example 7

Oil-containing wastewater from the API separator of an oil company was treated with alum and a liquid cationic polymer made according to Example 5. The pH was adjusted from 9.0 to 7.3 with 760 ppm $H_2SO_4$. An optimum alum dosage of approximately 75 ppm provided good oil/water separation. However, a large sludge volume was generated.

The alum could be totally replaced by less than 5 ppm of the inventive polymer. Such replacement resulted in similar oil/water separation but a smaller sludge volume. Floc settling rate was slow but could be considerably increased by adding 0.2 ppm of a commercially available high molecular weight acrylamide/sodium acrylate copolymer containing 10% sodium acrylate by weight after liquid cationic addition. In fact, a host of commercially available high molecular weight acrylamide polymers were successfully used. Liquid cationic polymer treatments were successfully performed without any initial pH adjustment of the oil-containing wastewater.

Example 8

This application involved the oil-containing waste from a gear and process plant of a major automotive company. Due to recirculation of acidic water from an oil-cooking process the pH of the oily waste was approximately 4.0. Adjustment of pH with lime was used to provide a pH of 7.0 to optimize alum activity.

The plant's treatment program consisted of 450 ppm lime followed by 200 ppm alum. Corresponding clarification results produced a good oil/water break with excellent effluent clarity. However, a large volume of sludge was generated which was found to be a major problem in the batch processes employed by the treatment plant.

It was found that liquid cationic polymer made according to Example 5 at dosages of 5 - 10 ppm could replace the alum. This application had the distinct advantage of drastically reducing the sludge build-up in the batch tanks to enable more batch treatments per sludge blow-down periods.

The results of this particular treatment application are reported below in Table II, which gives a comparison of alum dosage vs. polymer dosage with flocculation activity and effluent clarity being visually observed.

TABLE II

| Alum (ppm) | Polymer (ppm) | Lime (ppm) | Observations |
|---|---|---|---|
| 100 | — | 250 | only slight flocculation activity |
| 200 | — | 250 | " |
| 300 | — | 250 | " |

TABLE II-continued

| Alum (ppm) | Polymer (ppm) | Lime (ppm) | Observations |
|---|---|---|---|
| — | 10 | 250 | " |
| — | 20 | 250 | " |
| — | 30 | 250 | " |
| 200 | — | 450 | good floc activity, decent clarity |
| — | 5 | 450 | best floc activity, clarity |
| — | 10 | 450 | good floc activity, decent clarity |
| — | 15 | 450 | " |
| — | 20 | 450 | " |

Example 9

A liquid cationic polymer made according to Example 5 was tested as oil/water separator in the oil-containing wastewater generated by an automotive plant. Initial pH of the waste was 7.0. At 750 ppm of product, the polymer yielded poor floc formation but good oil separation. At a product dosage of 500 ppm fair floc formation was yielded. The use of either alum or acid as aids in breaking the emulsion was not required.

Example 10

An oil-containing waste treatment plant with a very small capacity illustrated a very successful application of a liquid cationic polymer, made according to Example 5, as a demulsifier.

Jar test studies revealed that an optimum alum dosage of 200 ppm would produce a thick, voluminous, slow settling floc, further reducing the already small capacity of the treatment plant (35,000 gallons per day). However, alum replacement by 20 ppm of the polymer produced a more dense, more rapidly settling floc which helped to indirectly increase treatment capacity. Both treatments (alum and polymer) yielded good oil/water separation with clear effluent of only 30 ppm oil compared to an initial oil content of 150 ppm.

Example 11

Application of two liquid cationic type polymers for the treatment of oil-containing waste at a large automotive plant was very successful. The first polymer was a commercially available polyamine product (hereafter Commercial Product A). The second polymer was made according to Example 5. It was observed that 80% of the time the waste coming into the treatment plant had a pH greater than 9.0. Acid was used for pH adjustment to about 7.0 before chemical treatment addition. Twenty percent of the time the waste had a pH of 7.0 and required no acid adjustment. In either case, 500 ppm of Commercial Product A was added at pH of 7.0. Such application resulted in good oil/water separation.

Application of the inventive polymer to the pH 7.0 waste at 500 ppm resulted in poor oil/water separation. Alum was needed to enhance clarifcation activity. However, if the waste was treated with this polymer when the pH was still at 9.0 or greater, 350 ppm would provide excellent oil separation and effluent clarity.

The results of these treatments are reported below in Table III with clarification activity being visually observed.

TABLE III

| Treatment | Dosage(ppm) | Observations |
|---|---|---|
| Com'l Prod. A, 2cc's 10% $H_2SO_4$ | 100 | No activity |
| " | 200 | Poor activity |
| " | 300 | Activity |
| " | 500 | Large floc |
| Com'l Product A | 500 | Good floc, good clarity |

TABLE III-continued

| Treatment | Dosage(ppm) | Observations |
|---|---|---|
| Example 5, 2cc's 10% $H_2SO_4$ | 200,225,250 | No activity |
| Example 5 | 275,300 | Good activity |
| " | 350 | Very good activity |
| " | 450 | " |
| " | 500 | More activity than equal dose of Commercial Product A as well as 1000 ppm Commercial Product A |
| " | 400 | " |
| " | 700 | Overdosed, no activity |

Having thus described the invention, what we claim is:

1. A process for separating oil from oil-containing wastewater which comprises treating the wastewater with a water-soluble cationic polymer consisting essentially of the product of the polymerization of an epihalohydrin with an alkylene polyamine having the formula

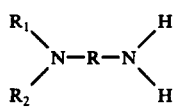

wherein R is a lower alkylene having from 2 to about 6 carbon atoms, and $R_1$ and $R_2$ are each a lower alkyl of from 1 to about 6 carbon atoms.

2. A process according to claim 1, wherein the mole ratio of epihalohydrin to polyamine is from about 0.60 : 1 to about 2.7 : 1.

3. A process according to claim 2, wherein said polymerization comprises reacting with the alkylene polyamine from about 50 to 90 percent of the amount of epihalohydrin to be polymerized, allowing the reaction to continue until the reaction medium attains a substantially uniform viscosity, and reacting the remaining portion of the epihalohydrin incrementally to obtain the cationic polymer, the temperature of polymerization being from about 60° to about 120° C.

4. A process according to claim 3, wherein the polymerization is carried out in an aqueous alkaline solution, and wherein the reaction medium is acidified after the last increment of epihalohydrin is reacted.

5. A process according to claim 4, wherein the epihalohydrin is epichlorohydrin, and wherein the alkylene polyamine is from the group consisting of dimethylaminopropylamine, diethylaminopropylamine, N,N-dimethylaminoethylamine, and N,N-diethylaminoethylamine.

6. A process according to claim 3, wherein the pH of the oil-containing wastewater is adjusted to from about 5.0 to about 8.0, and wherein the oil-containing wastewater is also treated with alum.

7. A process according to claim 2, wherein prior to polymer treatment, the pH of the oil-containing wastewater is adjusted to from about 5.0 to about 8.0, and wherein the oil-containing wastewater is also treated with alum.

8. A process according to claim 1, wherein te epihalohydrin is epichlorohydrin, and wherein the alkylene polyamine is from the group consisting of dimethylaminopropylamine, diethylaminopropylamine, N,N-dimethylaminoethylamine, and N,N-diethylaminoethylamine.

9. A process according to claim 8, wherein the alkylene polyamine is dimethylaminopropylamine.

10. A process according to claim 1, wherein prior to polymer treatment the pH of the oil-containing wastewater is adjusted to from about 5.0 to about 8.0, and wherein the oil-containing wastewater is also treated with alum.

11. A process according to claim 10, wherein the pH of the oil-containing wastewater is adjusted with acid.

12. A process according to claim 11, wherein the acid is sulfuric acid.

13. A process according to claim 10, wherein the pH of the oil-containing wastewater is adjusted with base.

14. A process according to claim 13, wherein the base in lime.

15. A process according to claim 10, wherein an anionic acrylamide polymer is also added to the oil-containing wastewater.

16. A process according to claim 10, wherein the pH of the oil-containing wastewater is adjusted to from about 6.0 to about 7.5

17. A process according to claim 1, wherein the oil comprises hydrocarbon oil.

18. A process according to claim 1, wherein the oil comprises petroleum oil.

* * * * *